United States Patent
Tani et al.

(10) Patent No.: US 8,730,548 B2
(45) Date of Patent: May 20, 2014

(54) IMAGE FORMING APPARATUS INCLUDING SETTING UNIT FOR SETTING RECOMMENDED FUNCTION

(75) Inventors: Takeshi Tani, Osaka (JP); Terumi Hayashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 680 days.

(21) Appl. No.: 12/829,420

(22) Filed: Jul. 2, 2010

(65) Prior Publication Data

US 2011/0002014 A1 Jan. 6, 2011

(30) Foreign Application Priority Data

Jul. 6, 2009 (JP) .................................. 2009-159892

(51) Int. Cl.
*H04N 1/46* (2006.01)
*H04N 1/40* (2006.01)
*G03G 15/00* (2006.01)
*G06F 3/048* (2013.01)

(52) U.S. Cl.
USPC ............. 358/539; 358/462; 399/85; 715/807; 715/813

(58) Field of Classification Search
USPC ......... 358/462, 539; 399/15, 77, 85; 715/805, 715/807, 811, 812, 813, 967, 968, 969
See application file for complete search history.

(56) References Cited

U.S. PATENT DOCUMENTS

| | | | |
|---|---|---|---|
| 6,181,432 B1 * | 1/2001 | Furuya .......................... | 358/1.11 |
| 6,201,894 B1 * | 3/2001 | Saito ............................. | 382/176 |
| 6,330,360 B1 * | 12/2001 | Saito ............................. | 382/202 |
| 6,721,463 B2 * | 4/2004 | Naoi et al. ..................... | 382/305 |
| 8,417,676 B2 * | 4/2013 | Petri .............................. | 707/694 |
| 2002/0018071 A1 * | 2/2002 | Ohnishi et al. ................ | 345/643 |
| 2003/0065807 A1 * | 4/2003 | Satomi et al. ................. | 709/231 |
| 2003/0086127 A1 * | 5/2003 | Ito et al. ......................... | 358/462 |
| 2003/0123732 A1 * | 7/2003 | Miyazaki et al. ............. | 382/186 |
| 2004/0170443 A1 | 9/2004 | Maeshima | |
| 2005/0004902 A1 * | 1/2005 | Torigoe et al. ..................... | 707/3 |
| 2005/0031208 A1 * | 2/2005 | Ohara et al. .................. | 382/202 |
| 2005/0073714 A1 * | 4/2005 | Makishima ................... | 358/1.15 |
| 2005/0259164 A1 * | 11/2005 | Kudo .......................... | 348/231.2 |
| 2006/0082831 A1 * | 4/2006 | Gotoh et al. .................. | 358/3.06 |

(Continued)

FOREIGN PATENT DOCUMENTS

JP 62-98967 A 5/1987
JP 2004-234195 A 8/2004

(Continued)

*Primary Examiner* — Madelein A Nguyen
(74) *Attorney, Agent, or Firm* — Birch, Stewart, Kolasch & Birch, LLP

(57) ABSTRACT

In an image forming apparatus having various and may functions, in order to easily set a function based on a scanned document, a CPU of an MFP executes a program including: when a document is scanned by a user (YES at S3200), the step of displaying a preview image of the scanned document (S3202); the step of OCR-processing the document data (S3204); when the scanned document has been registered in a document-by-document recommended functions list (YES at S3210), the step of reading the document-by-document recommended functions list from an HDD and displaying the document type and recommended menu on a touch-panel display (S3212); the step of setting the function registered in the recommended functions list in the MFP (S3222) unless the setting of recommended menu is changed (NO at S3218); and the step of executing copy/transmission process based on the set function (S3224).

7 Claims, 12 Drawing Sheets

(56) References Cited

U.S. PATENT DOCUMENTS

| | | |
|---|---|---|
| 2006/0256375 A1 | 11/2006 | Abe |
| 2006/0274388 A1 | 12/2006 | Miyazawa et al. |
| 2007/0047814 A1 | 3/2007 | Yamazaki |
| 2007/0058211 A1* | 3/2007 | Kubota ................. 358/462 |
| 2007/0188792 A1* | 8/2007 | Tomita ................. 358/1.14 |
| 2007/0292036 A1* | 12/2007 | Nakayama ............. 382/232 |
| 2008/0040655 A1* | 2/2008 | Tanaka ................. 715/228 |
| 2008/0085133 A1* | 4/2008 | Ishii ..................... 399/83 |
| 2008/0112619 A1* | 5/2008 | Fujimoto et al. ....... 382/174 |
| 2008/0212115 A1* | 9/2008 | Konishi ................. 358/1.9 |
| 2008/0212131 A1 | 9/2008 | Osada |
| 2009/0067724 A1* | 3/2009 | Hirohata ............... 382/190 |
| 2009/0141962 A1* | 6/2009 | Borgia et al. .......... 382/139 |
| 2009/0175491 A1* | 7/2009 | Charpentier ........... 382/100 |
| 2009/0251729 A1 | 10/2009 | Nakawaki |
| 2009/0290883 A1* | 11/2009 | Nakahara .............. 399/27 |
| 2010/0230493 A1* | 9/2010 | Akiyama ............... 235/437 |
| 2011/0102860 A1* | 5/2011 | Tomizawa ............. 358/448 |
| 2012/0045131 A1* | 2/2012 | He et al. ............... 382/190 |
| 2012/0047079 A1* | 2/2012 | Biesemann et al. .... 705/301 |

FOREIGN PATENT DOCUMENTS

| | | |
|---|---|---|
| JP | 2004-266408 A | 9/2004 |
| JP | 2006-222941 A | 8/2006 |
| JP | 2006-229386 A | 8/2006 |
| JP | 2006-317649 A | 11/2006 |
| JP | 2007-13924 A | 1/2007 |
| JP | 2007-166541 A | 6/2007 |
| JP | 2008-217349 A | 9/2008 |
| JP | 2009-253771 A | 10/2009 |

* cited by examiner

FIG. 4

| MEETING NAME | MONTHLY SALES MEETING |
|---|---|
| DATE | 2009/07/05 (MON) |
| TIME | 10:00-12:00 |
| PLACE | 22TH MEETING ROOM |
| CHAIRPERSON | MR. YAMADA, DIRECTOR OF 3RD MARKETING UNIT |
| ATTENDEE | SATO, SUZUKI, TAKAHASHI, TANAKA, WATANABE, ITO, YAMAMOTO, NAKAMURA, KOBAYASHI, SAITO, KATO |
| SECRETARY | YOSHIDA |
| AGENDA | BUSINESS RESULTS OF JUNE 2009 |
| | REPORT FROM MR. ○○ |
| | SALES GOAL FOR JULY 2009 |
| | REPORT FROM MR. △△ |
| | SALES FORECAST OF THE FIRST HALF OF 2009 |
| | REPORT FROM MR. ◇◇ |
| | TOP PERFORMERS |
| DATE OF NEXT MEETING | 2009/08/03 (MON) |

FIG. 5

| DOCUMENT NAME | SALES MEETING MINUTES | | | | | | |
|---|---|---|---|---|---|---|---|
| ITEMS FOR DETERMINING DOCUMENT TYPE | REGISTERED DOCUMENT FORMAT | | | | REGISTERED KEYWORDS | | |
| | SALES MEETING | | | | "SALES MEETING" AND "MONTHLY" | | |
| RECOMMENDED COPY FUNCTION | NUMBER OF COPIES | PAPER SIZE | COLOR MODE | DENSITY | DOUBLE-SIDED | COLLECTED | SPECIAL FUNCTION |
| | 13 | A4 | GRAY SCALE | CHARACTER | ONE-SIDED → DOUBLE-SIDED | — | — |
| RECOMMENDED TRANSMISSION FUNCTION | TRANSMISSION FUNCTION | TRANSMISSION DESTINATION | DOCUMENT TRANSMISSION SIZE | DENSITY | RESOLUTION (dpi) | FORMAT | COLOR MODE | SPECIAL FUNCTION |
| | SCAN-TO-MAIL | yamada.taro@sh.co.jp satou.taro@sh.co.jp suzuki.taro@sh.co.jp tanaka.hanako@sh.co.jp ... | A4 | CHARACTER | 200 × 200 | PDF/MMR (G4) | GRAY SCALE | — |

FIG. 6

PROJECT PROPOSAL | CONFIDENTIAL

| DIRECTOR IN CHARGE | MANAGER IN CHARGE | PERSON IN CHARGE |
|---|---|---|
| | | |

PROJECT NAME

PROJECT CODE

SUB-PROJECT NAME

PROJECT GROUP NAME

COMMENCEMENT DATE | END DATE

PROJECT NUMBER | STATUS

BACKGROUND

PROJECT CONTENTS

BUDGET

COST

| ITEM | UNIT PRICE | QUANTITY | SUM |
|---|---|---|---|
| | | | |

SALES

| ITEM | UNIT PRICE | QUANTITY | SUM |
|---|---|---|---|
| | | | |

PROFIT

FIG. 7

| DOCUMENT NAME | PROJECT PROPOSAL | | | | | | |
|---|---|---|---|---|---|---|---|
| ITEMS FOR DETERMINING DOCUMENT TYPE | REGISTERED DOCUMENT FORMAT | | | | REGISTERED KEYWORDS | | |
| | PROJECT PROPOSAL | | | | "PROJECT PROPOSAL" AND "PROJECT" | | |
| RECOMMENDED COPY FUNCTION | NUMBER OF COPIES | PAPER SIZE | COLOR MODE | DENSITY | DOUBLE-SIDED | COLLECTED | SPECIAL FUNCTION |
| | 2 | A4 | AUTO | AUTO | ONE-SIDED →ONE-SIDED | — | — |
| RECOMMENDED TRANSMISSION FUNCTION | TRANSMISSION FUNCTION | TRANSMISSION DESTINATION | DOCUMENT TRANSMISSION SIZE | DENSITY | RESOLUTION (dpi) | FORMAT | COLOR MODE | SPECIAL FUNCTION |
| | SCAN-TO-FOLDER | SHARED FOLDER/ PROJECT FOLDER | A4 | AUTO | 400×400 | ENCODED PDF/MMR (G4) | AUTO | — |

FIG. 10

IMAGE FORMING APPARATUS INCLUDING SETTING UNIT FOR SETTING RECOMMENDED FUNCTION

CROSS-REFERENCE TO RELATED APPLICATION

This nonprovisional application claims priority under 35 U.S.C. §119(a) on Patent Application No. 2009-159892 filed in Japan on Jul. 6, 2009, the entire contents of which are hereby incorporated by reference.

BACKGROUND OF THE INVENTION

1. Field of the Invention

The present invention relates to an image forming apparatus operable in a copy mode, a facsimile mode and the like and provided with a number of functions for each mode. More specifically, the present invention relates to an image forming apparatus capable of automatically setting an appropriate function in accordance with a scanned document.

2. Description of the Background Art

It has become increasingly common to connect an image forming apparatus having a printer function or a copy function to a network, to allow use by a plurality of users. Further, the number of apparatuses having a plurality of modes such as a copy mode, an image communication mode (typically a facsimile communication mode; hereinafter "facsimile" may also be denoted as FAX or fax), a network-supported printer mode and a scanner mode, such as multi-function peripherals (MFP) as one type of image forming apparatuses, is increasing. The image communication mode includes the facsimile communication mode of transmitting/receiving image data using public line, an Internet facsimile communication mode of transmitting/receiving image data using Internet connection, an electronic mail communication mode of transmitting/receiving image data as an attachment to an electronic mail (scan-to-mail), an image transfer mode of transferring image data to a storage inside of the MFP, and an image transfer mode (scan-to-folder) of transferring image data to a specific folder using a network line.

In such a multi-function peripheral, each user selects a mode from the plurality of modes, and further sets a function. By way of example, the user selects a copy mode, sets a function of duplex (two-sided) printing or collective printing (such as 2-in-1 by which two pages of an original document are printed on one sheet, or 4-in-1 by which four pages of an original document are printed on one sheet), whereby images are formed on sheets of paper in a desired manner. Appropriate combinations of these functions come to be more frequently used.

When a user uses such a multi-function peripheral (image forming apparatus), the user inputs image data using, for example, the scanner function, performs image processing (such as collection) by inputting various instructions through an operation panel, and prints the results. Some apparatuses allow the user to confirm the result of processing, by providing a thumb-nail image or a preview image to ease user operation. Even in such an apparatus, it is still necessary for the user to switch the mode and to set the function. Thus, it is still troublesome to select an appropriate copying function or an image forming function as regards the document set by the user for reading.

Japanese Patent Laying-Open No. 2006-317649 (hereinafter referred to as "'649 Reference") discloses, as a solution to such a problem, a screen control method for an image forming apparatus that significantly saves the user's trouble. The screen control method disclosed in '649 Reference is a method of controlling a screen of an image forming apparatus including an operation display having an image display unit as a user operation unit, for performing a selected image forming process on input image information. According to the screen control method, items first displayed on the image display unit are selected in accordance with the type of read document information read and input by a document reading unit.

According to the screen control method, copy function and the like operable by the user are displayed as recommendations, in accordance with the read document information read and input by the document reading unit. Therefore, it is possible for the user, by simply operating following the display, to obtain an appropriate copy or the like using the image forming apparatus.

The screen control method for the image forming apparatus disclosed in '649 Reference described above simply selects the items first displayed on the image display unit to be operated by the user, in accordance with the type of read document information read and input by the document reading unit. For example, if the read document is a color document, a menu for color document is displayed. It is necessary for the user to set a function or functions for the color document, in accordance with the displayed color document menu. Therefore, selection of an appropriate function and setting of the appropriate function for the read document still remain troublesome.

SUMMARY OF THE INVENTION

The present invention was made to solve the above-described problem and its object is to provide an image forming apparatus having various and many functions that are appropriately combined and used, in which functions recommended in accordance with the read document are presented for easy setting, whereby a number of functions can be appropriately combined and used.

According to an aspect, an image forming apparatus according to the present invention executes a prescribed process based on a set function. The image forming apparatus includes: a scanning unit scanning a document for obtaining image data; a determining unit determining a document type based on the image data and determination data for identifying a document type; a storage unit storing, for each document type, recommended function recommended to be set in the image forming apparatus; and a setting unit, setting the recommended function stored in accordance with the determined document type, in the image forming apparatus.

In the image forming apparatus, the image data of a document to be processed is obtained and the document type is determined. When the document type is determined, recommended functions stored type-by-type of the document can be recognized. Therefore, the recommended functions can be automatically set in the image forming apparatus. Therefore, in an image forming apparatus having various and many functions in which the functions are appropriately combined and used, it is possible to easily set functions recommended in accordance with the read document. As a result, the image forming apparatus can be used with a number of functions of the image forming apparatus appropriately combined with each other.

The image forming apparatus may further include an input unit allowing, when a recommended function in accordance with the determined document type is not stored, a user to input a recommended function recommended to be set in the image forming apparatus.

For the document that is processed for the first time by the image forming apparatus, recommended functions are not stored. Therefore, the user inputs the recommended function for the document, to be stored in the apparatus. If a document of the same type as the document is processed, it is possible to easily set the recommended function in accordance with the read document.

If the determination data is a document form, the determining unit may include a form determining unit determining document type based on the image data and the document form.

By comparing the image data obtained by scanning with the document form (format), the document type can be determined.

If the determination data is text data representing a character string registered in advance for identifying a document type, the image forming apparatus may further include a reading unit for reading characters included in the document from the image data, and the determining unit may include a character determining unit determining a document type based on the read characters and the text data.

The scanned and obtained image data is read by an OCR (Optical Character Reader) or the like, and by comparing the read characters with the text data, the document type can be determined.

The setting unit may include a change setting unit for changing a recommended function stored in accordance with the determined document type based on a request by the user and setting the changed function in the image forming apparatus.

Since one or more of the recommended functions can be changed as requested by the user, the functions can be set as required by the user.

The image forming apparatus may further include a forming unit forming a recommended function different from the recommended function stored in accordance with the determined document type, based on the image data. In that case, the setting unit may include a changing unit for changing a recommended function stored in accordance with the determined document type to a different recommended function and setting the changed function in the image forming apparatus. The forming unit may include a recommended function forming unit forming, based on image data of a document of the same type as and having contents different from a document for which a recommended function is stored, a recommended function different from the stored recommended function.

If a document of the same type as the document whose recommended function is stored but having different contents is scanned, a recommended function different from the stored recommended function is formed. By way of example, even when the document is conference minutes of the same type, the number of copies may be different if the date of conference is different and the number of attendees is different. In such a case, a recommended function, different from the stored recommended function in the number of copies, is formed, based on the contents of the read document (by determining the number of attendees from the OCR characters). In this manner, the recommended functions can be changed in accordance with the contents of the document, even if the document is of the same type. Therefore, functions can be set in accordance with the contents of the document.

If the recommended function is changed, the storage unit may include a change storage unit for storing the changed recommended function.

It is possible to have the recommended function changed by the user stored. Therefore, it is unnecessary for the user to repeatedly change the recommended function.

The image forming apparatus may further include a communication unit exchanging, to/from another image forming apparatus, a recommended function and the determination data input to the another image forming apparatus. In that case, the storage unit may include a received information storage unit for storing the recommended function and the determination data input to the another image forming apparatus, received from the another image forming apparatus through the communication unit.

In the image forming apparatus, even when recommended functions are input using a plurality of image forming apparatuses, the recommended functions and determination data are commonly stored. Therefore, it is possible by any of the image forming apparatuses to determine the type of the scanned document and to automatically set the stored recommended functions.

The image forming apparatus may be connected to an information processing apparatus managing recommended functions input to a plurality of image forming apparatuses. In that case, the image forming apparatus may further include an information communication unit for communication with the information processing apparatus, and the storage unit may include an information storage unit for storing the recommended function and the determination data input to another image forming apparatus, received from the information processing apparatus through the communication unit.

In the image forming apparatus, even when recommended functions are input using a plurality of image forming apparatuses, the recommended functions and determination data are commonly stored in the information processing apparatus (for example, a server computer). Therefore, it is possible by any of the image forming apparatuses to determine the type of the scanned document and to automatically set the stored recommended functions.

According to the present invention, in an image forming apparatus having various and many functions in which the functions are appropriately combined and used, the type of the read document is determined and the functions recommended in accordance with the type are set easily in the image forming apparatus, whereby a number of functions can be appropriately combined and used.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows an example of a document processed by the MFP shown in FIG. 1.

FIG. 5 shows a document-by-document recommended functions list corresponding to the document of FIG. 4, stored in the server computer and the MFP shown in FIG. 1.

FIG. 6 shows an example of a document processed by the MFP shown in FIG. 1.

FIG. 7 shows a document-by-document recommended functions list corresponding to the document of FIG. 6, stored in the server computer and the MFP shown in FIG. 1.

FIGS. 10 to 13 are transition diagrams showing examples of images displayed on a touch-panel display when the program shown in FIG. 9 is executed.

DESCRIPTION OF THE PREFERRED EMBODIMENTS

Figure 1:
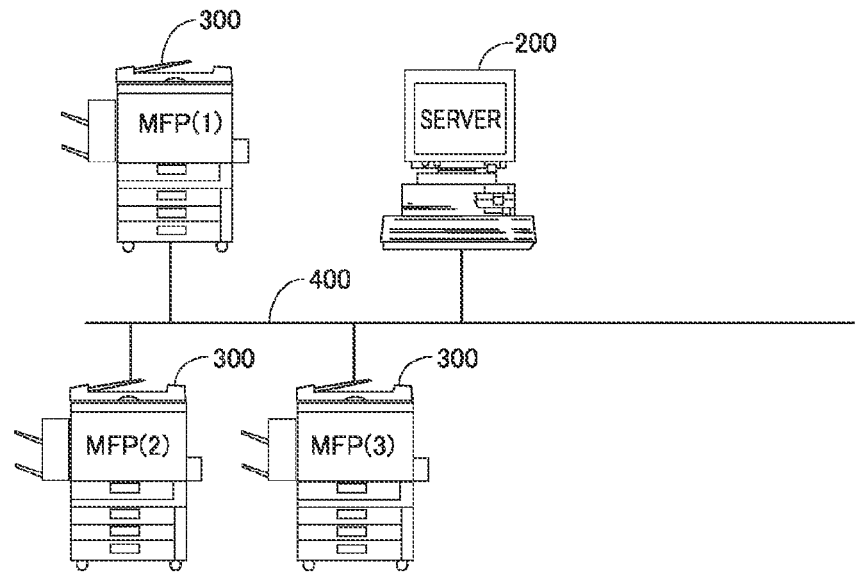
FIG. 1 shows an overall configuration of a network image forming system in accordance with an embodiment of the present invention.

In the following description, the same components are denoted by the same reference characters. Their functions and names are also the same. Therefore, detailed description thereof will not be repeated. In the following description, it is assumed that the image forming apparatus in accordance with the present invention is an MFP. The present invention, however, is applicable to any apparatus having the scan mode in which a document is scanned by an optical mechanism, a copy mode in which image data is printed on a sheet of recording paper, and an image communication mode in which image data is communicated (facsimile communication mode, Internet facsimile communication mode, electronic mail communication mode (scan-to-mail), and image transfer mode (scan-to-folder)), and not limited to an MFP. Therefore, an MFP having only the image communication mode (that transmits the image only and does not form any image) can be regarded as the image forming apparatus in accordance with the present invention.

Further, in the network image forming system setting the MFP function in accordance with the read document as will be described in the following, the server computer manages the registration history of document-by-document recommended functions lists of a plurality of MFPs. An MFP receives the registration history from the server computer and, in accordance with the document read by the MFP, a function or functions of the MFP are set. By such an approach, it becomes possible for the MFP to use the document-by-document recommended functions list registered not by itself but by other MFPs. It is also possible to set the recommended functions document by document by a single MFP, or to set the recommended functions document by document by each of the MFPs through communication among the plurality of MFPs, without providing any server computer. Specifically, the server computer (image processing apparatus) is not an essential component of the present invention.

[Overall System Configuration]

Referring to FIG. 1, an overall configuration of the network image forming system in accordance with the embodiment of the present invention will be described. The network image forming system includes: MFP(1) 300 to MFP(3) 300 (hereinafter MFP(1) 300 to MFP(3) 300 may be generally referred to as MFP 300) setting a recommended function or functions in accordance with the scanned document; and a server computer 200 processing the document-by-document recommended functions registered by the user in the plurality of MFPs 300. Server computer 200 and MFP 300 are connected to be communicable to each other by a network line 400 in accordance with, for example, IEEE802.3. Though MFP(1) 300 to MFP(3) 300 are denoted by the same reference characters, they are not necessarily MFPs having the same functions.

In the present embodiment, when the user registers the document-by-document recommended functions, each MFP 300 transmits the document-by-document recommended functions list together with a document format data uniquely identifying the document format, to server computer 200. Server computer 200 stores the document-by-document recommended functions list of each MFP 300 received through network line 400, together with the document data format, in a document-by-document recommended functions management table. Server computer 200 transmits, at a constant time interval, difference data of document-by-document recommended functions lists, together with document format data, to MFP 300, based on the document-by-document recommended functions management table. MFP 300 stores the document-by-document recommended functions list, together with document format data, in the document-by-document recommended functions management table. When a document is scanned by the user, MFP 300 identifies the document type using the document format data, and based on the document-by-document recommended functions management table, automatically sets functions recommended for the identified document type, in the MFP itself.

As described above, in the present embodiment, when a document is scanned by the user to use the MFP, the document type is identified based on the document data obtained by scanning. If recommended functions are set for the identified document type, recommended functions are displayed on a touch-panel display. When the user, looking at the display, requests setting of a recommended function, the function suitable for the scanned document can automatically be set.

In the following, in the specification and drawings, server computer 200 may be simply referred to as a server, and MFP 300 may be simply referred to as an MFP.

[Hardware Configuration]

<Server Computer 200>

Figure 2:
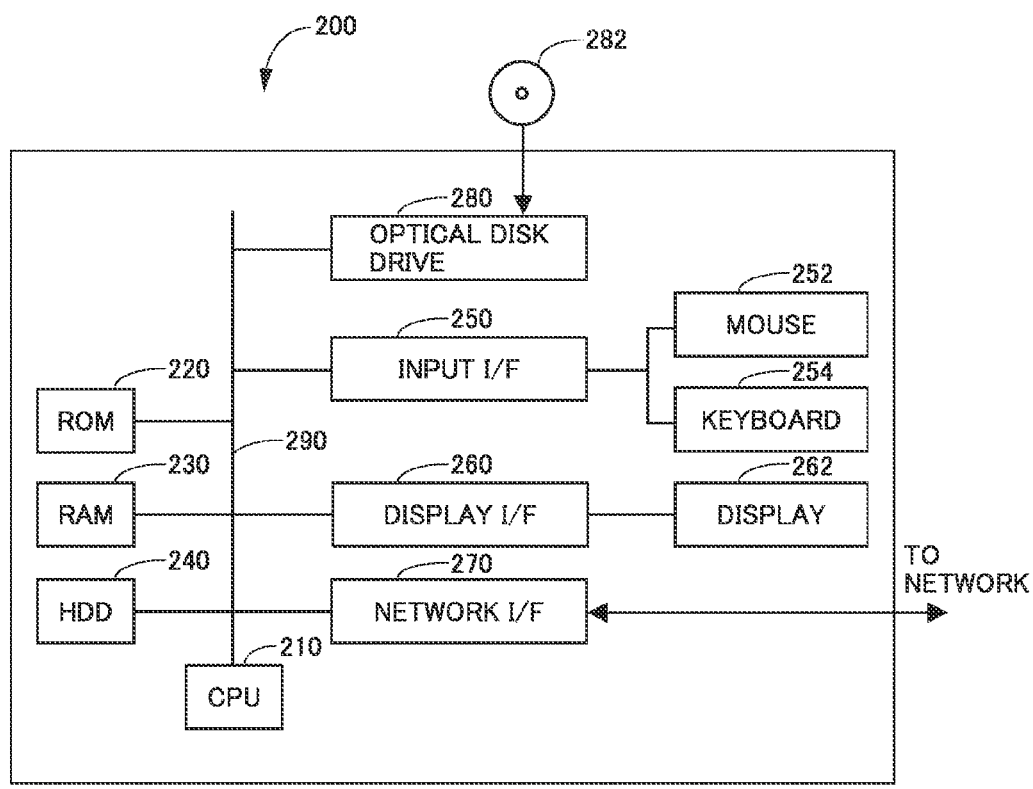
FIG. 2 is a control block diagram showing hardware configuration of a server computer shown in FIG. 1.

Referring to FIG. 2, server computer 200 forming the network image forming system in accordance with the present embodiment includes: a bus 290; a CPU (Central Processing Unit) 210 connected to bus 290; an ROM (Read Only Memory) 220 connected to bus 290; an RAM (Random Access Memory) 230 connected to bus 290; a hard disk (HDD) 240 connected to bus 290; an optical disk drive 280, connected to bus 290, on which an optical disk 282 is mountable, and capable of writing of information to optical disk 282 and reading of information from optical disk 282; an input interface (hereinafter referred to as "input IF"; "interface" may be denoted as "IF" or "I/F") 250, connected to bus 290, for providing an interface for connection between a mouse 252 and a keyboard 254; a display interface (hereinafter referred to as a "display I/F") 260, connected to bus 290, for providing an interface related to connection with a display 262; and a network interface (hereinafter referred to as a "network I/F") 270 providing wired or wireless (in the present embodiment, wired) connection to network line 400. Server computer 200 may include a magnetic disk drive on which a magnetic disk is mountable, and capable of writing of information to the magnetic disk and reading of information from the magnetic disk, in place of/in addition to optical disk drive 280.

Bus 290, ROM 220, RAM 230, HDD 240, optical disk drive 280, input I/F 250, display I/F 260 and network I/F 270 all operate in cooperation with each other under the control of CPU 210, and as the server computer in accordance with the present invention, server computer 200 realizes processes of various applications. By way of example, such applications realize a server computer in the network image forming system, which receives the document-by-document recommended functions list from each MFP 300, maintains document-by-document recommended functions management table for collective management of document-by-document recommended functions lists registered in MFPs 300, and transmits the same to MFPs 300.

The computer program or programs causing server computer 200 to operate as the server computer of the network image forming system in accordance with the present embodiment are stored in optical disk 282 to be inserted to optical disk drive 280, and transferred to HDD 240. Alternatively, the programs may be transmitted through network line 400 to server computer 200 and stored in HDD 240. At the time of execution, the programs are loaded to RAM 230. The programs may be directly loaded to RAM 230 from optical disk 282 or through network line 400.

These programs include a plurality of instructions causing server computer 200 to operate as the server computer in the network image forming system in accordance with the present embodiment. Some of the basic functions necessary to realize these operations are provided by an operating system (OS) operating on server computer 200 or a third-party program, or a module of various tool kits installed in server computer 200. Therefore, the program may not necessarily include all functions required to realize the method and system in accordance with the present embodiment. The program may include only the instructions executing a prescribed process as server computer 200 described above, by calling appropriate functions or "tools" in a controlled manner to attain the desired results. General operations of a computer as the substance of server computer 200 are well known and, therefore, description will not be given here.

<MFP 300>

Figure 3:
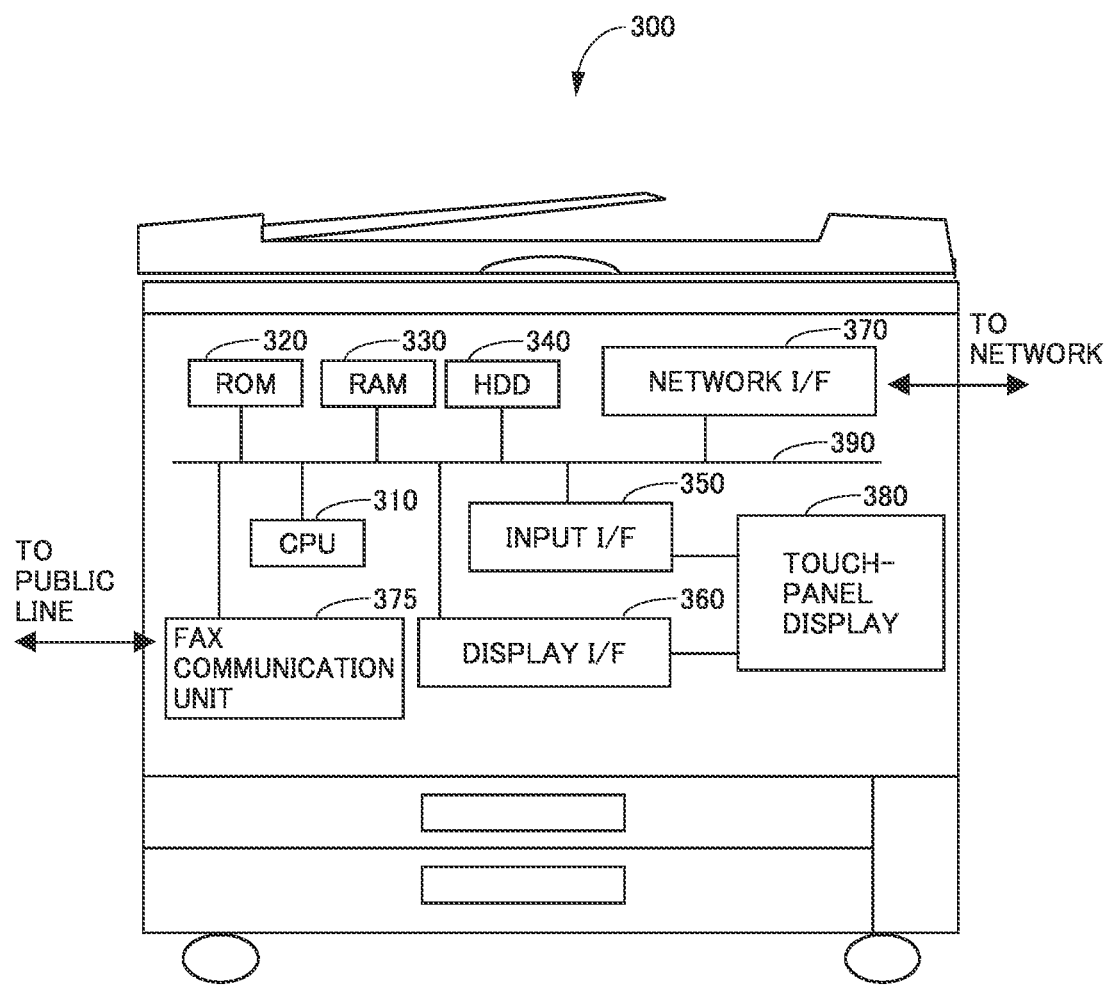
FIG. 3 is a control block diagram showing hardware configuration of an MFP shown in FIG. 1.

Referring to FIG. 3, MFP 300 forming the network image forming system in accordance with the present embodiment includes: a bus 390; a CPU 310 connected to bus 390; an ROM 320 connected to bus 390; an RAM 330 connected to bus 390; a hard disk (HDD) 340 connected to bus 390; an input I/F 350 and a display I/F 360, connected to bus 390, for providing interface related to connection with touch-panel display 380; a network I/F 370, connected to bus 390, for providing wired or wireless (in the present embodiment, wired) connection to network line 400; and a FAX communication unit 375, connected to bus 390, for providing connection to public line. Though not shown in FIG. 3, MFP 300 includes hardware buttons such as a start button and ten-key buttons.

Bus 390, ROM 320, RAM 330, HDD 340, input I/F 350, display I/F 360, network I/F 370 and FAX communication unit 375 all operate in cooperation with each other under the control of CPU 310, and realize the printing process, FAX transmission/reception process, scanner process and copy process in MFP 300. These processes are executed by various components forming MFP 300, not shown in FIG. 3, under the control of CPU 310.

The image communication mode of MFP 300 includes the facsimile communication mode of transmitting/receiving image data using public line through FAX communication unit 375, the Internet facsimile transmission mode of transmitting/receiving image data using the Internet connection through network I/F 370, the electronic mail transmission mode of transmitting/receiving image data attached to an electronic mail (scan-to-mail), and an image transfer mode (scan-to-folder) of transferring image data to a specific folder using network line 400.

MFP 300 includes, for example, a document reading unit (scanner unit), an image forming unit, a paper feed unit, and a paper discharge unit. In MFP 300, on image data of an original document read by the document reading unit, various image processing operations are done by CPU 310, and the resulting image data is output to the image forming unit. MFP 300 includes a so-called laser type (electrophotographic type) printing function, in which a laser beam is used for exposure. It may have a different type printing function. Further, in MFP 300, read image data is input to CPU 310 and subjected to OCR processing, whereby text data (character codes) can be obtained.

—Facsimile Mode—

In the following, the facsimile communication operation in the facsimile mode (also referred to as a facsimile/image transmission mode) will be described. In the facsimile mode, a document reading unit (scanner unit) and FAX communication unit 375 mainly operate for the transmitting operation and FAX communication unit 375 and an image forming unit mainly operate for the receiving operation, whereby the facsimile communication operation is realized. The operations in the Internet facsimile mode, the electronic mail transmission mode (scan-to-mail) and the image transfer mode (scan-to-folder) of transferring image data to a specific folder are substantially similar, though the destination is not a FAX number but a computer address or a mail address, or the communication interface is not FAX communication unit 375 but network I/F 370.

Transmission Operation

In MFP 300, when the facsimile mode is designated, a document placed on a platen is read by a document reading unit as image data, the read image data is input to CPU 310, the image data is subjected various image processing operations using various functions, and the resulting image data is output to FAX communication unit 375.

FAX communication unit 375 on the transmitting side MFP 300 connects a designated transmitting side line to a designated transmission destination, converts the image data to communication data in accordance with facsimile transmission standard, and transmits the same to a receiving side facsimile apparatus (for example, an MFP 300 having the facsimile communication function).

Communication Operation

When the line is connected, FAX communication unit 375 of the receiving side MFP 300 detects a communication request signal from FAX communication unit 375 of the transmitting side MFP 300, and transmits an acknowledgement signal. Thereafter, FAX communication units 375 pass performance information provided in the transmitting side and the receiving side, respectively, determine the highest possible communication speed available, and coding/code correction method of image data, and set modem communication method. Using image signal format in accordance with the determined communication method, data is transmitted from FAX communication unit 375 of the transmitting side MFP 300 to FAX communication unit 375 of the receiving side MFP 300. When transmission ends, the line is disconnected.

Receiving Operation

FAX communication unit 375 on the receiving side MFP 300 converts the received data to image data, and transmits the same to an image forming unit. The received data may be converted by the image forming unit. The image forming unit prints the document image represented by the image data converted from the received data on a sheet of recording paper, as in the image forming operation in a copy mode, as will be described below.

—Copy Mode—

In the following, the image forming operation in the copy mode will be described. The image forming unit is for printing an image represented by the image data read by the document reading unit and subjected to image processing by various functions, on a sheet of recording paper. The image forming apparatus includes, by way of example, a photoreceptor drum, a charger, a laser scanning unit, a developer, a transfer device, a cleaning device, a fixing device and a neutralizer.

In the image forming unit, a feeding path, for example, is formed, and a sheet of recording paper fed from the paper feed unit is fed along the feeding path. The paper feed unit draws out sheets of recording paper stacked on a paper feed cassette or on a manual feed tray one by one, and feeds the sheet of paper to the feeding path of the image forming unit.

While the sheet of recording paper is fed along the feeding path of image forming unit, the sheet passes between the photoreceptor drum and the transfer device, and further passes through the fixing device, whereby printing is done on the sheet of recording paper.

The photoreceptor drum rotates in one direction, and its surface is cleaned by the cleaning device and the neutralizer and, thereafter, uniformly charged by the charger. The laser scanning unit modulates the laser beam based on the image data to be printed, and repeatedly scans the surface of photoreceptor drum with the laser beam in a main scanning direction, whereby an electrostatic latent image is formed on the surface of photoreceptor drum. The developer develops the electrostatic latent image by supplying toner to the surface of photoreceptor drum, and thus, a toner image is formed on the surface of photoreceptor drum.

The transfer device transfers the toner image on the surface of photoreceptor drum to the sheet of recording paper passing between the transfer device and the photoreceptor drum. The fixing device includes a heating roller for heating the sheet of recording paper and the pressure roller for pressing the sheet of recording paper. As the sheet of recording paper is heated by the heating roller and pressed by the pressure roller, the toner image that has been transferred to the sheet of recording paper is fixed on the sheet. The sheet of recording paper discharged from the fixing device (printed paper) is discharged to the discharge tray.

—Scanner Mode—

In the following, the operation in the scanner mode will be described. In the scanner mode, the scanning function is realized mainly by the operation of the document reading unit (scanner unit).

In MFP 300, a document placed on a platen is read as image data by the document reading unit. The read image data is input to CPU 310, where the image data is subjected to image processing operations based on various functions, and then the image data is output to a sheet of recording paper in the copy mode, the image data is transmitted in the facsimile transmission mode, the Internet facsimile transmission mode or the electronic mail communication mode (scan-to-mail), or the image data is stored in HDD 340 or transmitted to a computer connected to a network, through network I/F 370 in the image transfer mode (scan-to-folder).

In MFP 300, the read image data is subjected to OCR processing, and based on the resulting text data (character codes), it is possible to determine the document type or to recognize any name described in the document.

[Document and Configuration of Document-by-Document Recommended Functions Management Table]

Referring to FIGS. 4 to 7, documents processed by MFP 300 and the document-by-document recommended functions list stored in the document-by-document recommended functions management table in HDD 240 of server computer 200 and HDD 340 of MFP 300 will be described. In the document-by-document recommended functions management table, a plurality of document-by-document recommended functions lists are stored, indicating what function is registered by the user as recommended function for what type of document, in the MFP 300, based on the document-by-document recommended functions lists transmitted from MFPs 300. One document-by-document recommended functions list corresponds to one type of document (document of a specific type classified among a plurality of different types of documents). Further, in association with the document-by-document recommended functions lists, document format data allowing determination of document type from features such as document form is stored as registered document formats.

FIG. 4 shows "Sales Meeting Minutes" as an exemplary document processed by MFP 300. As shown in FIG. 4, the document has a specific format (document format) surrounded by ruled lines, and prescribed items are described on provided spaces of the document format. MFP 300 recognizes the document by OCR process, and based on the names described on sections of "Chairperson," "Attendee" and "Secretary," confirms the number of attendees of the sales meeting.

For the document "Sales Meeting Minutes" shown in FIG. 4, functions registered by the user are stored as the document-by-document recommended functions list shown in FIG. 5, in the document-by-document recommended functions management table.

As shown in FIG. 5, the document-by-document recommended functions list consists of a field for storing a document name to be displayed on touch-panel display 380, a field for storing items for determining the document type, a field for storing recommended copy functions, and a field for storing recommended transmission functions. In FIG. 5, as the items for determining the document type, a registered document format and registered keywords are stored. The registered document format is related to document format data that is registered with the name "Sales Meeting."

The registered document format represents data (document format data) of a once read document format, registered as a template format. The registered document format represents data stored in a computer-recognizable form, for specifying the document type based on elements such as characteristic configurations (ruled lines and the like) of the document, characteristic arrangement of items, positions where any figure or picture is inserted and font type and font size. Any data form that can attain such a function may be used, and the form of document format data is not specifically limited. MFP 300 compares the scanned document and the document format data. If the scanned document matches (perfectly or substantially matches) the document format data, the read document is determined to be "Sales Meeting Minutes" for which the document-by-document recommended functions list has been registered.

The registered keyword is text data (character codes) for determining whether or not there is a match with characters in the OCR-processed document, for determining the document type. In FIG. 5, for the document having the document name "Sales Meeting Minutes," "Sales Meeting" and "Monthly" are registered by the user as registered keywords. MFP 300 compares the OCR-recognized characters with the two registered keywords, and if these two registered keywords are included in the OCR-recognized characters, it determines that the read document is the "Sales Meeting Minutes" for which the document-by-document recommended functions list has been registered.

Further, for the document having the document name "Sales Meeting Minutes," the recommended copy functions shown in FIG. 5 are registered by the user. In this example, the recommended copy number is "13", recommended copy size is "A4", recommended color mode is "gray scale," recommended copy density is "characters," and the recommended double-sided function is "one-sided→double-sided."

For the document having the document name "Sales Meeting Minutes," the recommended transmission functions shown in FIG. 5 are registered by the user. In this example, the recommended transmission function is "scan-to-mail," recommended transmission destinations are "yamada.taro@sh.co.jp, satou.taro@sh.co.jp, suzuki.taro@sh.co.jp, tanaka.taro@sh.co.jp, . . . " recommended document transmission size is "A4", recommended transmission density is "characters," recommended resolution is "200 dpi×200 dpi", recommended format is "PDF/MMR(G4)", and recommended color mode is "gray scale."

FIG. 6 shows "Project Proposal" as another exemplary document processed by MFP 300. As shown in FIG. 6, the document has a specific format (document format) surrounded by a plurality of frames, and prescribed items are described on provided spaces of the document format. MFP 300 recognizes the document by OCR process, and specifically recognizes that the document is "Confidential" and that it includes approval seals of "Director in Charge," "Manager in Charge" and "Person in Charge."

For the document "Project Proposal" shown in FIG. 6, functions registered by the user are stored as the document-by-document recommended functions list shown in FIG. 7, in the document-by-document recommended functions management table.

The document-by-document recommended functions list shown in FIG. 7 includes the same fields as the document-by-document recommended functions list shown in FIG. 5, and it is stored in the same document-by-document recommended functions management table.

As shown in FIG. 7, in the document-by-document recommended functions list, a document format data registered by the name of "Project Proposal" is registered as a registered document format for the document having the document name "Project Proposal," and "Project Proposal" and "Project" are registered as registered keywords.

Further, for the document having the document name "Project Proposal," the recommended copy functions shown in FIG. 7 are registered by the user. In this example, the recommended copy number is "2", recommended copy size is "A4", recommended color mode is "auto," recommended copy density is "auto," and the recommended double-sided function is "one-sided→one-sided."

For the document having the document name "Project Proposal," the recommended transmission functions shown in FIG. 7 are registered by the user. In this example, the recommended transmission function is "scan-to-folder," recommended transmission destination is "shared folder/project folder," recommended document transmission size is "A4", recommended transmission density is "auto," recommended resolution is "400 dpi×400 dpi", recommended format is "encoded PDF/MMR(G4)", and recommended color mode is "auto."

Each of the lists shown in FIGS. 5 and 7 is the document-by-document recommended functions list set for one type of document. The database storing a plurality of document-by-document recommended functions lists as such is referred to as the document-by-document recommended functions management table. The document-by-document recommended functions lists shown in FIGS. 5 and 7 and the document-by-document recommended functions management table (database) are examples, and the present invention is not limited to such lists and the database as above.

[Software Configuration]

Figure 8:
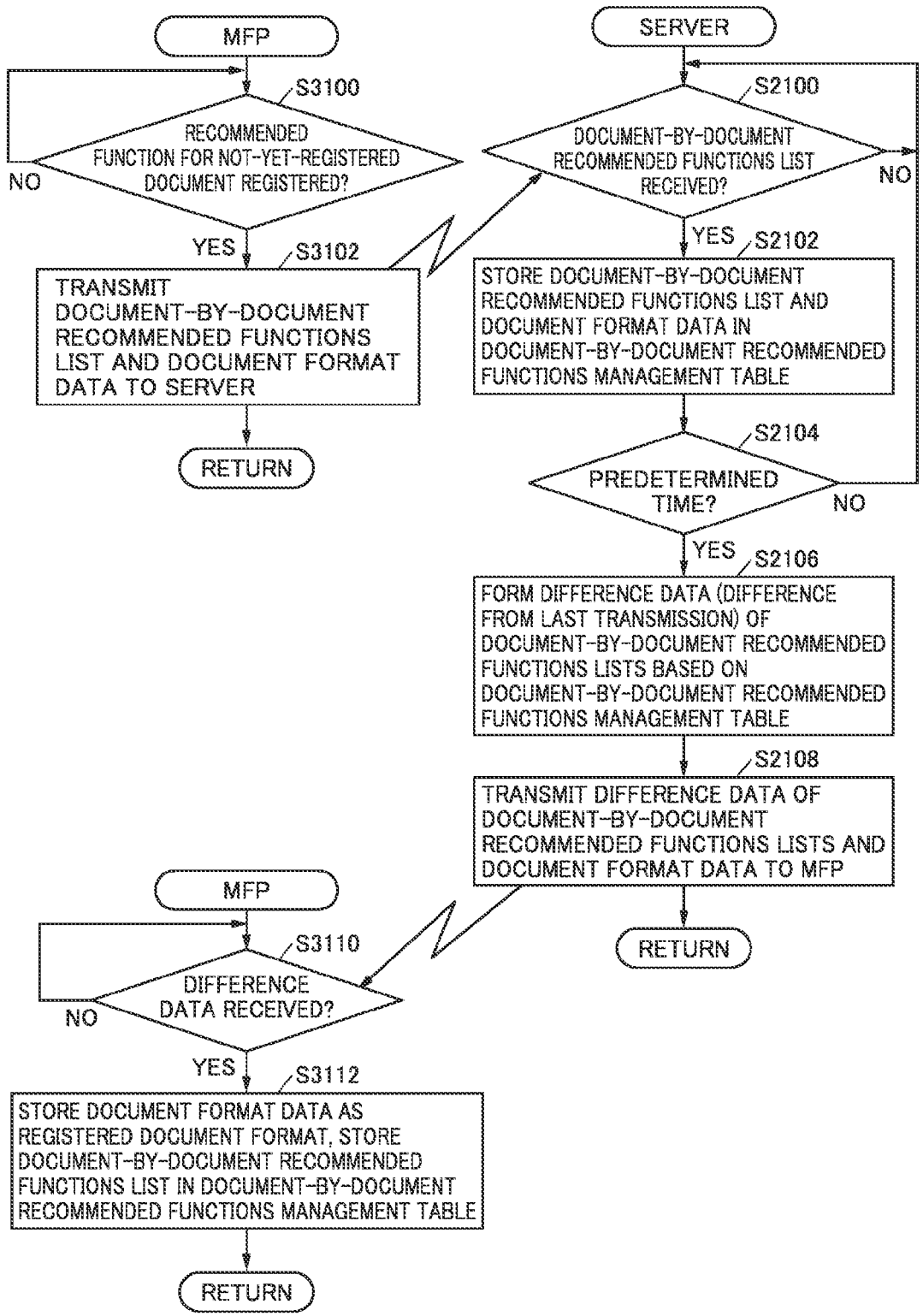
FIG. 8 is a flowchart representing a control structure of a document-by-document recommended function registering program executed by the server computer and the MFP shown in FIG. 1.

Referring to FIG. 8, a control structure of a computer program executed in MFP 300 and server computer 200 for realizing the process for setting functions recommended in accordance with the type of read document in MFP 300 of the network image forming system in accordance with the present embodiment will be described.

The program shown on the upper left part of FIG. 8 is executed by CPU 310 of MFP 300. At step (hereinafter "step" will be denoted by "S") S3100, CPU 310 of MFP 300 (hereinafter simply referred to as CPU 310) determines whether or not the user using MFP 300 has registered recommended functions for a not-yet-registered document (whether or not any document format data and document-by-document recommended functions list are registered). If CPU 310 determines that recommended function or functions are registered for a not-yet-registered document (YES at S3100), the process proceeds to S3102. Otherwise (NO at S3100), the process returns to S3100, and waits until it is determined that recommended function or functions are registered for a not-yet-registered document by the user using MFP 300.

At S3102, CPU 310 transmits the document-by-document recommended functions list and the document format data to server computer 200.

The program on the right side of FIG. 8 is executed by CPU 210 of server computer 200. At S2100, CPU 210 of server computer 200 (hereinafter simply referred to as CPU 210) determines whether or not the document-by-document recommended functions list is received from MFP 300. At this time, a plurality of MFPs 300 are the objects. If it is determined that the document-by-document recommended functions list is received from MFP 300 (YES at S2100), the process proceeds to S2102. Otherwise (NO at S2100), the process returns to S2100, and waits until it is determined that the document-by-document recommended functions list is received from MFP 300.

At S2102, CPU 210 stores the document-by-document recommended functions list (FIG. 5 or FIG. 7) together with the document format data received from MFP 300 in the document-by-document recommended functions management table. As the document-by-document recommended functions lists are received from a plurality of MFPs 300 and stored in the document-by-document recommended functions management table, a large number of document-by-document recommended functions lists come to be accumulated in the document-by-document recommended functions management table together with the document format data. Here, in order to avoid excessive storage of data of document-by-document recommended functions management table, a document-by-document recommended functions list of a document registered but not read, or a document-by-document recommended functions list not set as recommended functions (a list for which a recommended function button is not pressed, even if the list is displayed on touch-panel display 380, as will be described later) may be deleted from the document-by-document recommended functions management table.

At S2104, CPU 210 determines whether or not a predetermined time is reached. The predetermined time is determined corresponding to a time interval for maintenance of the document-by-document recommended functions management table. If it is determined that the predetermined time (for example, a time corresponding to the time interval of 12 hours) is reached (YES at S2104), the control proceeds to S2106. Otherwise (NO at S2104), the control returns to S2100. Such a process is done since reception of document-by-document recommended functions list from a plurality of MFPs 300 and updating of document-by-document recommended functions management table are executed on real-time basis, while a document-by-document recommended functions list of one MFP 300 may be reflected on a document-by-document recommended functions management table of another MFP at some time interval. Depending on the number of MFPs 300 connected to network line 400 and on the frequency of registration of document-by-document recommended functions, the determination at S2104 may be omitted. In that case, the document-by-document recommended functions management table of each MFP 300 is updated on real-time basis.

At S2106, CPU 210 forms difference data (document-by-document recommended functions list added from the last transmitted list) of the document-by-document recommended functions lists, based on the document-by-document recommended functions lists stored in the document-by-document recommended functions management table. At S2108, CPU 210 transmits the difference data of document-by-document recommended functions lists and the document format data to MFP 300. As to the transmission of difference data of document-by-document recommended functions lists to MFP 300, here, only the change made after the last transmission is transmitted in the form of difference data, to reduce communication traffic.

The program on the lower left part of FIG. 8 is executed by CPU 310 of MFP 300. At S3110, CPU 310 determines whether or not the difference data of document-by-document recommended functions lists and the document format data are received from server computer 200. If it is determined that the difference data of document-by-document recommended functions lists is received from server computer 200 (YES at S3110), the process proceeds to S3112. Otherwise (NO at S3110), the process returns to S3110 and waits until it is determined that the difference data of document-by-document recommended functions lists is received from server computer 200.

At S3112, CPU 310 stores the difference data of document-by-document recommended functions lists received from server computer 200 in the document-by-document recommended functions management table stored in HDD 340 of MFP 300. At this time, the document format data is also stored in HDD 340 of MFP 300. Thus, the document-by-document recommended functions management table stored in MFP 300 is updated. As a result, in the network image forming system in accordance with the present embodiment, even if a user uses a different MFP 300 for registering the document-by-document recommended functions, it is possible to manage the registration history of document-by-document recommended functions in each MFP 300, regardless of which MFP 300 is used.

Figure 9:
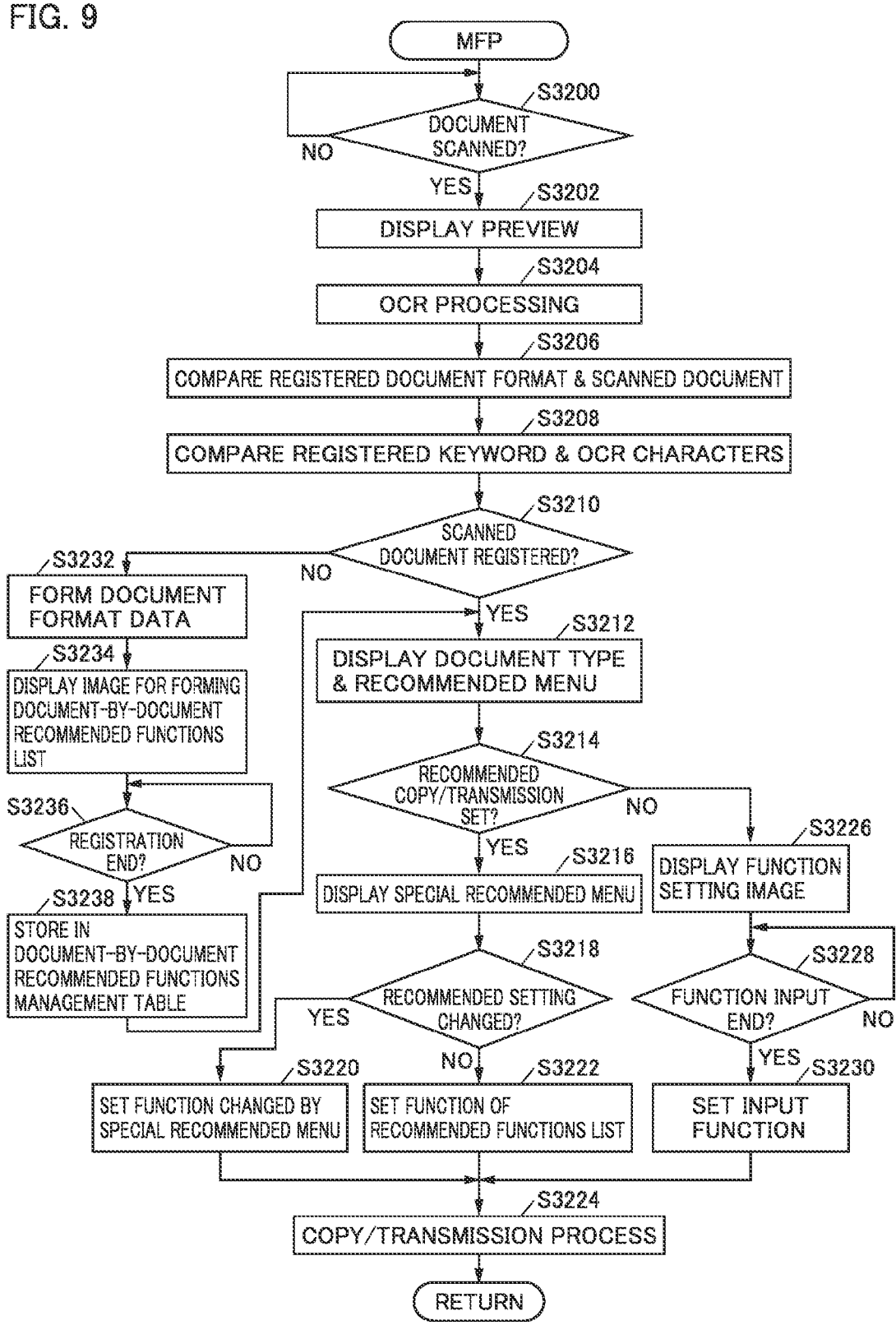
FIG. 9 is a flowchart representing a control structure of an image formation program executed by the MFP shown in FIG. 1.

Referring to FIG. 9, a control structure of a computer program executed by MFP 300 when the user performs copying or image communication process (image forming process) of a specific document by the network image forming system in accordance with the present embodiment will be described.

At S3200, CPU 310 determines whether or not the user scanned a document using the document reading unit of MFP 300. If it is determined that the user has scanned a document (YES at S3200), the process proceeds to S3202. Otherwise (NO at S3200), the process returns to S3200, and waits until it is determined that the user has scanned a document.

At S3202, CPU 310 displays as a preview the image of read document on touch-panel display 380. At S3204, CPU 310 performs OCR processing on the image of read document.

At S3206, CPU 310 compares the registered document format stored in HDD 340 with the scanned document. At S3208, CPU 310 compares the registered keyword of document-by-document recommended functions list in the document-by-document recommended functions management table stored in HDD 340 with OCR characters of the scanned document.

At S3210, CPU 310 determines whether or not the scanned document is registered in the document-by-document recommended functions management table. At this time, based on the result of comparison at S3206 and S3208, CPU 310 determines whether or not the scanned document is registered in the document-by-document recommended functions management table. If it is determined that the scanned document is registered in the document-by-document recommended functions management table (YES at S3210), the process proceeds to S3212. Otherwise (NO at S3210), the process proceeds to S3232.

At S3212, CPU 310 reads the document-by-document recommended functions list corresponding to the scanned document from the document-by-document recommended functions management table, and displays the document type and a recommended menu on touch-panel display 380.

At S3214, CPU 310 determines whether or not a request is made to set a recommended menu displayed on touch-panel display 380. At this time, CPU 310 determines that a request is made to set the recommended menu if "RECOMMENDED COPY SETTING" or "RECOMMENDED TRANSMISSION SETTING" displayed on touch-panel display 380 is pressed. If it is determined that a request is made to set the recommended menu displayed on touch-panel display 380 (YES at S3214), the process proceeds to S3216. Otherwise (NO at S3214), the process proceeds to S3226.

At S3216, CPU 310 displays a special recommended menu on touch-panel display 380. The special recommended menu refers to an additional recommended function menu (a menu different from the recommended function menu and referred to as a special recommended menu) displayed on a pop-up image, if recommendation setting is registered for the read document. By way of example, the special recommended menu may recommend:

(1) page collection if the font size of the document is a certain size or larger;

(2) change of the number of copies registered by automatically counting the number of attendees described in the minutes;

(3) setting of transmission addresses by OCR-recognition of attendees in the minutes;

(4) setting of the number of copies or transmission destinations depending on presence/absence of a seal; and (5) setting of a transmission folder or a file name based on the date and time of document formation recognized by OCR (the date of formation described in the minutes) rather than the date and time of reading document, or based on the document name recognized by OCR (document name described on the minutes).

At S3218, CPU 310 determines whether or not a request is made to change the registered recommended functions. Specifically, the document-by-document recommended functions list is read, the recommended menu is displayed on touch-panel display 380 and the special recommended menu is displayed, and the CPU determines whether or not there is a request by the user to change from the registered recommended menu to special recommended menu. Assume, for example, that the recommended number of copies of 13 is registered in the document-by-document recommended functions list as shown in FIG. 5, while the number of attendees described in the minutes is 8. If the special recommended menu for changing the number of copies to 8 is selected, it means the request is made. If it is determined that the request is made to change the registered recommended functions (YES at S3218), the process proceeds to S3220. Otherwise (NO at S3218), the process proceeds to S3222.

At S3220, CPU 310 sets the function changed in accordance with the special recommended menu from the function registered in the document-by-document recommended functions list (sets in the state of special recommended menu). Thereafter, the process proceeds to S3224.

At S3222, CPU 310 sets the functions registered in the document-by-document recommended functions list (sets in the state of recommended menu). Then, the process proceeds to S3224.

At S3224, CPU 310 executes the copy/transmission process. Then, the process ends.

At S3226, CPU 310 displays a function setting image on touch-panel display 380. Specifically, since the function registered in the document-by-document recommended functions list is not selected, the function setting image is displayed allowing input (setting) of individual function. At S3228, CPU 310 determines whether input of individual function is completed. At this time, if a FUNCTION INPUT END button on touch-panel display 380 is pressed, CPU 310 determines that the input of individual function is completed. If it is determined that the input of individual function is completed (YES at S3228), the process proceeds to S3230. Otherwise (NO at S3228), the process returns to S3228, and waits until it is determined that input of individual function is completed.

At S3230, CPU 310 sets the individually input functions (sets the functions input by the user). Then, the process proceeds to S3224.

At S3232, CPU 310 forms document format data of the scanned document. Specifically, since the scanned document has not been registered in the document-by-document recommended functions management table, it is necessary to register the document-by-document recommended functions list in the document-by-document recommended functions management table. For this purpose, the document format data to be registered with document-by-document recommended functions list is formed.

At S3234, CPU 310 displays an image for forming the document-by-document recommended functions list on touch-panel display 380. At S3236, CPU 310 determines whether or not registration of the document-by-document recommended functions list for the new document is completed. At this time, if a REGISTRATION END button for the document-by-document recommended functions list on touch-panel display 380 is pressed, CPU 310 determines that registration of the document-by-document recommended functions list is completed. If it is determined that registration of the document-by-document recommended functions list is completed (YES at S3236), the process proceeds to S3238. Otherwise (NO at S3236), the process returns to S3236, and waits until it is determined that registration of the document-by-document recommended functions list is completed.

At S3238, CPU 310 stores the document format data formed for the scanned document as a registered document format data, and stores the registered document-by-document recommended functions list in the document-by-document recommended functions management table. Thereafter, the process proceeds to S3212. After the process of S3238, the process may be passed to S3224.

[Operation]

The operation of network image forming system in accordance with the present embodiment based on the structures and flowcharts as above will be described in the following.

<Operation of Registering Document-by-Document Recommended Functions>

Referring to the document shown in FIG. 4, the document-by-document recommended functions list shown in FIG. 5 and the flowchart of FIG. 8, the operation of registering document-by-document recommended functions in the network image forming system will be described.

As will be described later, when the user scans a not-yet-registered document (for example, the Sales Meeting Minutes shown in FIG. 4) and registers recommended functions for the document using MFP 300 (YES at S3100), a document-by-document recommended functions list representing the functions registered by the user as the document-by-document recommended functions in the MFP 300 is transmitted, together with the document format data of the document, to server computer 200 (S3102).

In response to such an operation of MFP 300, server computer 200 receives the document-by-document recommended functions list and the document format data from MFP 300 (YES at S2100). The received document-by-document recommended functions list is stored in the form of document-by-document recommended functions list shown in FIG. 5, in the document-by-document recommended functions management table in HDD 240 (S2102), together with the document format data.

When a predetermined time for transmitting the document-by-document recommended functions lists of each document type collected in server computer 200 to MFPs 300 is reached (YES at S2104), based on the document-by-document recommended functions lists stored in the document-by-document recommended functions management table, the difference data (difference from the last transmission) of the document-by-document recommended functions lists is formed (S2106). The difference data of document-by-document recommended functions lists is transmitted, together with the document format data, to MFPs 300 (S2108). Of the difference data, a document-by-document recommended functions list transmitted from a certain MFP 300 is stored in the document-by-document recommended functions management table in HDD 340 of that MFP 300 and, therefore, the data may not be transmitted to the certain MFP 300.

In response to such an operation of server computer 200, each of the plurality of MFPs 300 receives the difference data of document-by-document recommended functions lists together with the document format data from server computer 200 (YES at S3110). The received document format data is stored as the registered document format in HDD 340, and the difference data of document-by-document recommended functions lists of each document type is stored added to the document-by-document recommended functions management table stored in HDD 340 (S3112).

Server computer 200 receives the document-by-document recommended functions lists from the plurality of MFPs 300 and the document-by-document recommended functions management table (the table storing a plurality of document-by-document recommended functions lists shown in FIG. 5 or FIG. 7) is updated on real-time bases. Therefore, it follows that the document-by-document recommended functions lists are accumulated in the document-by-document recommended functions management table. While the document-by-document recommended functions lists are accumulated in the document-by-document recommended functions management table, the difference data of document-by-document recommended functions lists is transmitted to MFPs 300 at a preset time interval. In MFP 300, the document-by-document recommended functions management table stored in its HDD 340 is updated.

<Image Forming (Copy/Transmission) Operation>

Referring to the flowchart shown in FIG. 9 and the transitions of images displayed on touch-panel display 380 shown in FIG. 10-13, the image forming (copy/transmission) operation of the network image forming system will be described.

—When Scanned Document is Already Registered—

When the user scans a document (assume that the document is of the same type as "Sales Meeting Minutes" shown in FIG. 4) (YES at S3200), a preview image of the scanned document is displayed at the center of touch-panel display 380 (S3202). The scanned document is subjected to OCR processing (S3204), registered document formats are compared with the scanned document (S3206), the registered keywords are compared with the OCR-processed characters (S3208), and since the scanned document is already registered (YES at S3210), the document type and the recommended menu are displayed (S3212). At this time, an image such as shown in FIG. 10 is displayed on touch-panel display 380.

Figure 10:
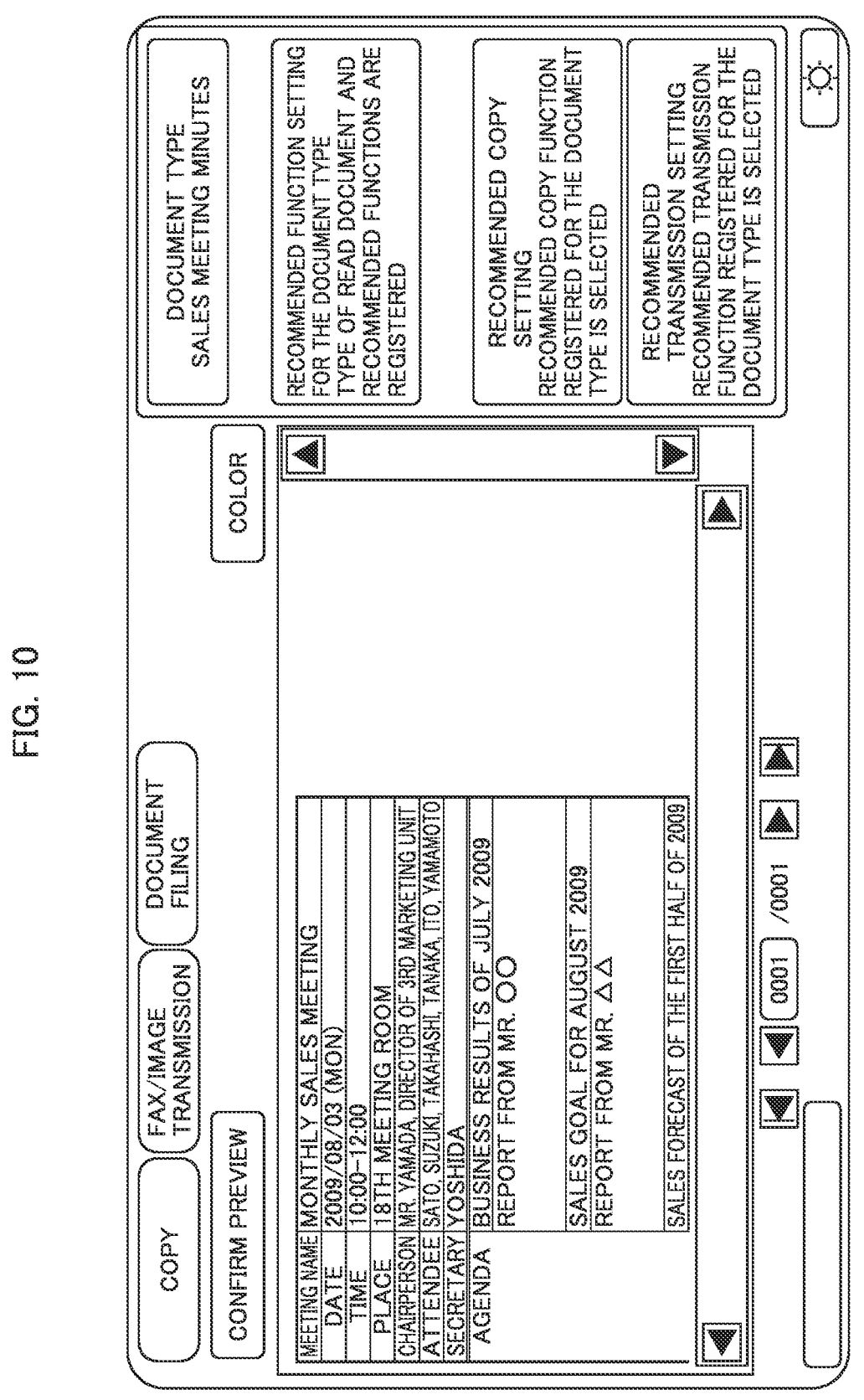

As shown in FIG. 10, the preview image of the scanned document is displayed at the center of touch-panel display 380, and on the right side of touch-panel display 380, the document type "Sales Meeting Minutes" is displayed. Further, on the right side of touch-panel display 380, a RECOMMENDED COPY SETTING button and a RECOMMENDED TRANSMISSION SETTING button are displayed. When the user presses the RECOMMENDED COPY SETTING button, the recommended copy functions registered in accordance with the document type are set, and when the user presses the RECOMMENDED TRANSMISSION SETTING button, the recommended transmission functions registered in accordance with the document type are set. It is preferable to have the contents of recommended copy functions and recommended transmission functions displayed on touch-panel display 380 to allow the user to confirm the contents.

When the user presses either the RECOMMENDED COPY SETTING button or the RECOMMENDED TRANSMISSION SETTING button shown in FIG. 10 (here, assume that the RECOMMENDED COPY SETTING button is pressed), the special recommended menu is displayed on touch-panel display 380 (YES at S3214 and S3216). Here, the scanned document is minutes of monthly sales meeting of August (number of attendees: 8), with the number of attendees being smaller than the monthly sales meeting of July (number of attendees: 13). For the document having the document name "Sales Meeting Minutes," the number of copies is set to 13, corresponding to the number of attendees, as shown in FIG. 5.

Figure 11:
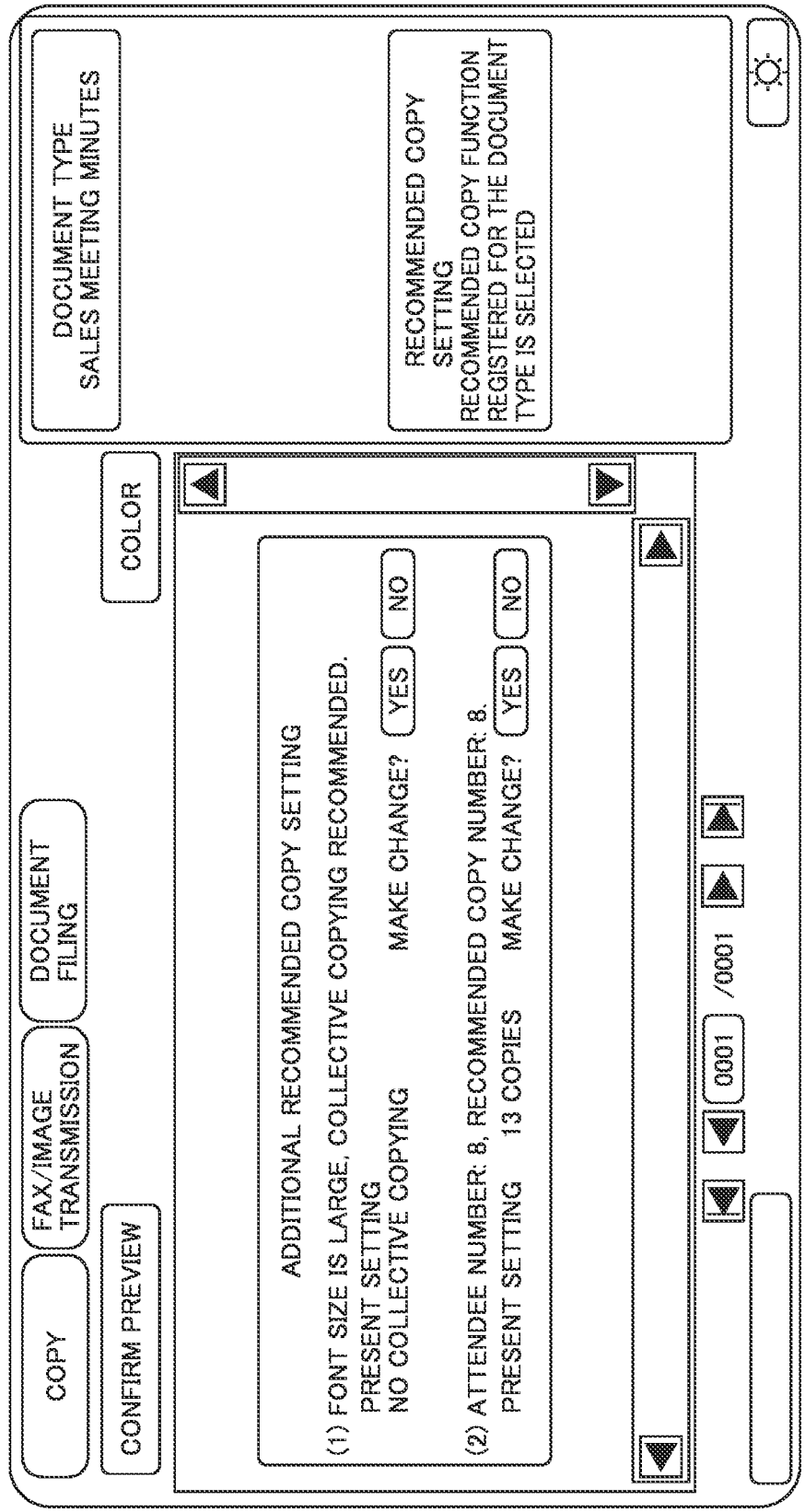

Here, if it is determined that the font size of the scanned document is large, a special recommended menu (additional recommended menu) for setting collective copying that is not registered (see FIG. 5) is displayed on touch-panel display 380. The number of attendees of the sales meeting of August is automatically counted based on the OCR characters of the scanned document, which is 8. Therefore, a special recommended menu (additional recommended menu) of changing the registered number of copies (13: see FIGS. 5) to 8 as the number of attendees in the minutes is displayed on touch-panel display 380. On touch-panel display 380, an image such as shown in FIG. 11 is displayed. Since the special recommended menu (additional recommended menu) is displayed in this manner, it is possible to easily change part of the contents registered as recommended functions. Particularly, when the maximum number of attendees of the meeting is registered as the number of copies and some are absent, the number of copies to be handed out at the meeting to the attendees can easily be changed.

When the user presses "YES" button of the special recommended menu (additional recommended menu) (YES at S3218), the registered recommended function is changed and set in MFP 300 (S3220). Specifically, when "YES" button corresponding to "(2) RECOMMENDED COPY NUMBER: 8" of FIG. 11 is pressed, the number of copies is changed from 13 to 8, and the function is set in MFP 300.

If the user presses "NO" button of the special recommended menu (additional recommended menu) (NO at S3218), the registered recommended function is set unchanged, in MFP 300 (S3222). Specifically, the number of copies is kept at 13, and the function is set in MFP 300.

If the user does not press either the RECOMMENDED COPY SETTING button or the RECOMMENDED TRANSMISSION SETTING button shown in FIG. 10 and presses, for example, the preview image, a function setting image is displayed on touch-panel display 380 (NO at S3214, S3226). Here, even though the scanned document is the sales meeting minutes of August, the MFP 300 is not set in accordance with the contents of document-by-document recommended functions list registered for the "Sales Meeting Minutes" in the document-by-document recommended functions management table stored in HDD 340, and each function is input (set) one by one.

When setting of functions related to copying or image data transmission ends (YES at S3228), the registered recommended functions are not used but the functions input one by one to MFP 300 are set (S3230).

After the functions related to copying or image data transmission are set in this manner (S3220, S3222, S3230), the copy/transmission process is executed (S3224).

—When Scanned Document is Not-Yet-Registered—

When the user scans a document (not the "Sales Meeting Minutes" shown in FIG. 4 or the "Project Proposal" shown in FIG. 6, but, for example, "Board Meeting Minutes" not stored in a document-by-document recommended functions management table) by MFP 300 (YES at S3200), a preview image of the scanned document is displayed at the center of touch-panel display 380 (S3202). The scanned document is subjected to OCR processing (S3204), registered document formats are compared with the scanned document (S3206), and the registered keywords are compared with the OCR-processed characters (S3208). Since the scanned document is not-yet registered (NO at S3210), the document format data of the scanned document is formed. (S3232).

Figure 12:
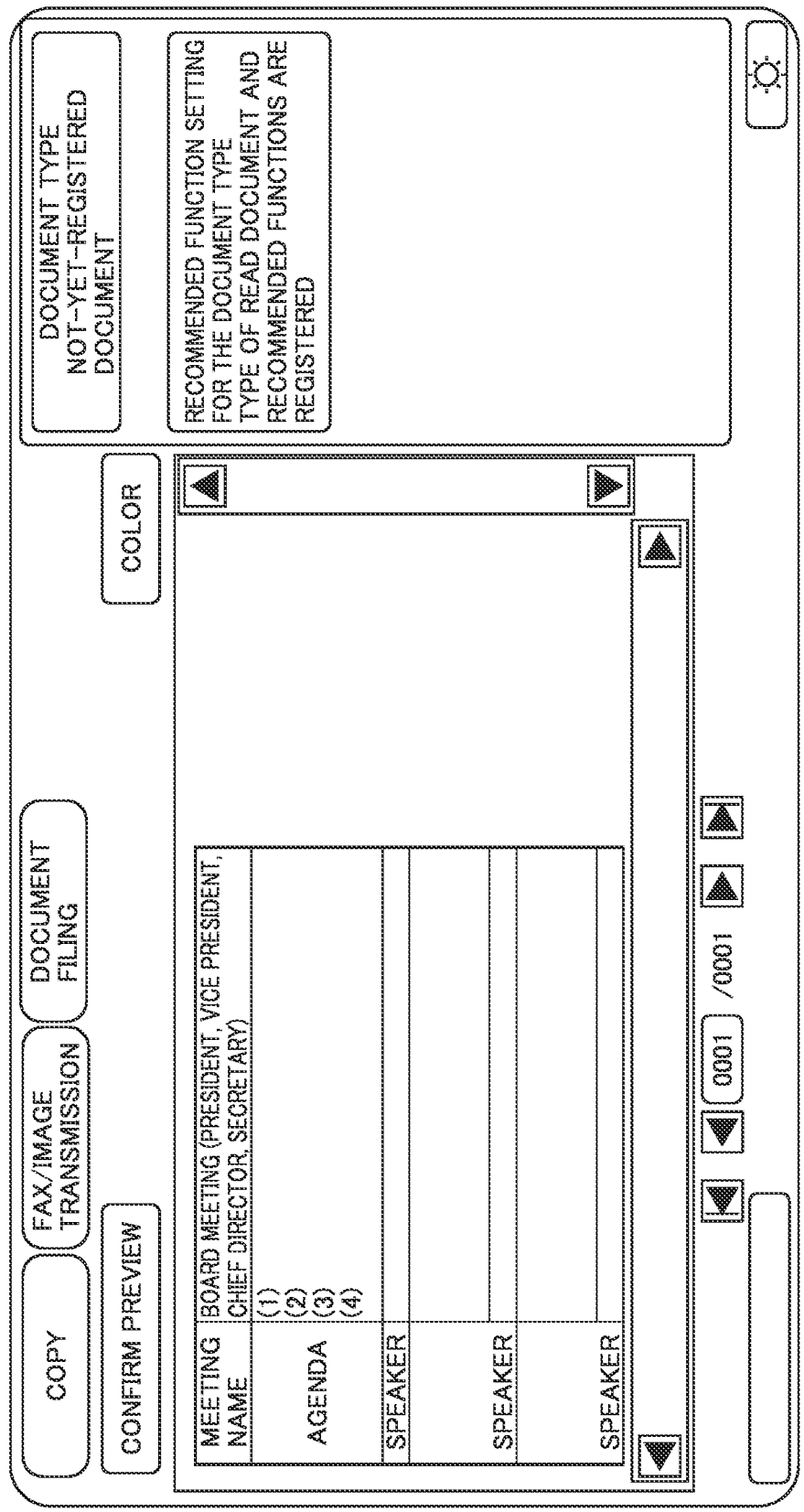

Here, an image urging registration of recommended functions, including a message that the document type is not-yet-registered document, is displayed. Specifically, an image such as shown in FIG. 12 is displayed on touch-panel display 380. When the user presses "RECOMMENDED FUNCTION SETTING FOR THE DOCUMENT TYPE" shown in FIG. 12, the type of scanned document and the recommended functions are set. For this purpose, an image for forming the document-by-document recommended functions list is displayed on touch-panel display 380. An image shown in FIG. 13 is displayed on touch-panel display 380.

Figure 13:
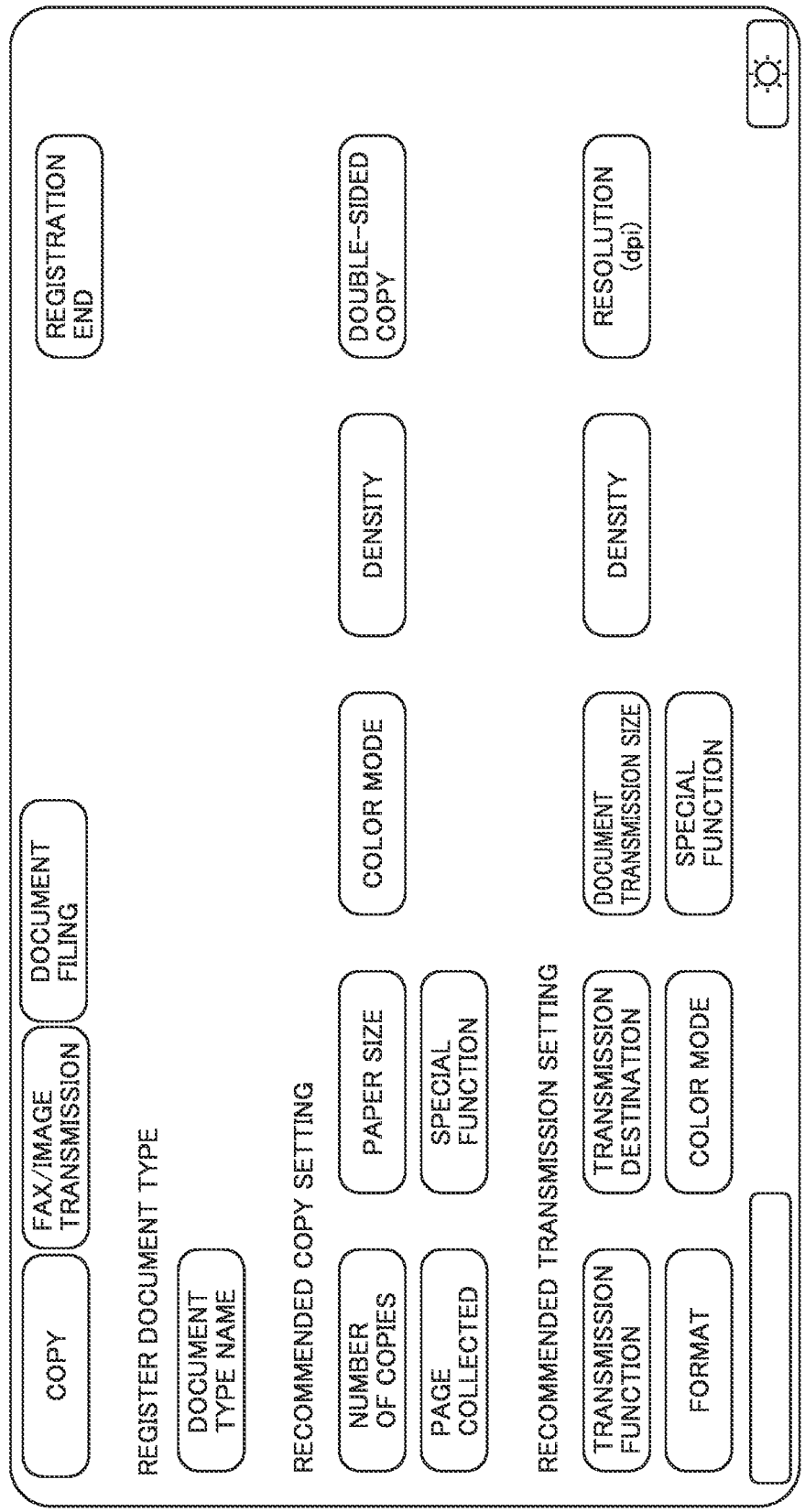

As shown in FIG. 13, on touch-panel display 380, an image allowing registration of the document type and setting of recommended copy functions and recommended transmission functions is displayed. When a REGISTRATION END button (see FIG. 13) of document-by-document recommended functions list on touch-panel display 380 is pressed (YES at S3226), the formed document format data is stored as the registered document format data and the registered document-by-document recommended functions list is stored in the document-by-document recommended functions management table, for the scanned document (S3228). In the operation thereafter, images such as shown in FIGS. 10 and 11 are displayed on touch-panel display 380 as in the case of a document for which document-by-document recommended functions list is registered, and the image forming operation (copy/transmission) is performed.

As described above, in the network image forming system in accordance with the present embodiment, the type of document scanned by the MFP is identified, and recommended functions stored in accordance with the document can be automatically set. Therefore, in an MFP having various and many functions in which the functions are appropriately combined and used, recommended functions in accordance with the read document are presented, and the functions are easily set, whereby a number of functions can be used appropriately combined with each other.

Further, it is also possible to set automatically the recommended functions appropriate for the scanned document by a single MFP, or to set automatically the recommended functions for the document scanned by each of the MFPs through communication among a plurality of MFPs, without providing any server computer. In that case, the document-by-document recommended functions management table may be stored by a single MFP, or a document-by-document recommended functions management table common to a plurality of MFPs is stored through communication among the plurality of MFPs.

Further, characters or stamps of "Confidential" or "Classified" may be identified, presence/absence of an approval seal may be identified, or the name of seal may be identified, and based on the identification information, special recommended menu (additional recommended menu) may be displayed. Further, from the OCR-recognized characters, attendees may be identified, mail addresses may be drawn from the names of attendees, and the destinations in the scan-to-mail mode may be automatically set.

Further, when the special recommended menu (additional recommended menu) is selected, the document-by-document recommended functions list for the document may be changed (overwritten) to the contents of the special recommended menu.

Even when either the RECOMMENDED COPY SETTING button or the RECOMMENDED TRANSMISSION SETTING button is selected, some of the settings registered in the document-by-document recommended functions list may be changed. Further, the document-by-document recommended functions list for the document may be changed to the contents of changed setting.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image forming apparatus executing a prescribed process based on a set function, comprising:
    a scanning unit scanning a document for obtaining image data;
    a determining unit determining a determined document type based on said image data and determination data for identifying a document type;
    a storage unit storing, for each document type, a stored recommended function recommended to be set in said image forming apparatus;
    a setting unit, setting the recommended function stored in accordance with said determined document type, in said image forming apparatus;
    an input unit allowing, when a recommended function in accordance with said determined document type is not stored, a user to input an inputted recommended function recommended to be set in said image forming apparatus; and
    a forming unit forming a formed recommended function different from the stored recommended function, based on said image data,
    wherein
    said determination data is format data stored in a computer-recognizable format for specifying a document type based on ruled lines as characteristic configurations of the document, characteristic arrangement of items, positions to insert a figure or picture and font type and font size;
    said determining unit includes a form determining unit determining the determined document type based on said image data and said format data;
    said setting unit includes a changing unit for changing the stored recommended function to a different changed recommended function and setting the changed recommended function in said image forming apparatus.

2. The image forming apparatus according to claim 1, wherein said setting unit includes a change setting unit for changing the stored recommended function based on a request by a user and setting the changed recommended function in said image forming apparatus.

3. The image forming apparatus according to claim 2, wherein said storage unit includes a: change storage unit for storing said changed recommended function.

4. The image forming apparatus according to claim 1, wherein
    said forming unit includes a recommended function forming unit forming, based on image data of a document of the same type as and having contents different from a document for which the stored recommended function is stored, the formed recommended function different from said stored recommended function.

5. The image forming apparatus according to claim 1, wherein said storage unit includes a change storage unit for storing said changed recommended function.

6. The image forming apparatus according to claim 1, further comprising
    a communication unit exchanging, to/from another image forming apparatus, the stored recommended function and said determination data input to said another image forming apparatus; wherein
    said storage unit includes a received information storage unit for storing said stored recommended function and said determination data input to said another image forming apparatus, received from said another image forming apparatus through said communication unit.

7. The image forming apparatus according to claim 1, connected to an information processing apparatus managing recommended functions input to a plurality of image forming apparatuses, further comprising an information communication unit for communication with said information processing apparatus; wherein said storage unit includes an information storage unit for storing the stored recommended function and said determination data input to another image forming apparatus, received from said information processing apparatus through said communication unit.

\* \* \* \* \*